United States Patent [19]

Deussen

[11] Patent Number: 5,037,007
[45] Date of Patent: Aug. 6, 1991

[54] DEVICE FOR DISPENSING A DOSED AMOUNT OF FREE-FLOWING MATERIAL, IN PARTICULAR LIQUID MEDICATION FROM A CONTAINER

[75] Inventor: Heino Deussen, Eltville, Fed. Rep. of Germany

[73] Assignee: Stella KG Werner Deussen, Eltville, Fed. Rep. of Germany

[21] Appl. No.: 411,861

[22] Filed: Sep. 25, 1989

Related U.S. Application Data

[63] Continuation-in-part of PCT EP89/00039, Jan. 27, 1989.

[30] Foreign Application Priority Data

Feb. 5, 1988 [DE] Fed. Rep. of Germany ....... 3803366

[51] Int. Cl.$^5$ ............................................ G01F 11/02
[52] U.S. Cl. .................................. 222/321; 222/340; 222/378
[58] Field of Search ............... 222/321, 383, 378, 514, 222/336, 339, 319, 402.2, 453, 379, 320, 385, 340; 239/341, 333, 331; 604/246, 207, 407

[56] References Cited

U.S. PATENT DOCUMENTS 3,640,470  2/1972  Susuki et al. ...................... 239/333
4,371,097  2/1983  O'Neill ............................... 222/383
4,640,444  2/1987  Bundschuh ........................ 239/333

FOREIGN PATENT DOCUMENTS 0010963  5/1980  European Pat. Off. ............ 222/321
3122330  1/1983  Fed. Rep. of Germany .
3238379  4/1984  Fed. Rep. of Germany .
2314110  1/1977  France .
2562444  10/1985  France .

Primary Examiner—Michael S. Huppert
Assistant Examiner—Philippe Derakshani
Attorney, Agent, or Firm—H. Gibner Lehmann; K. Gibner Lehmann

[57] ABSTRACT

An improved container closure and dosing pump or syringe has a piston formed with a truncated cone-shaped face. A spring-biased operator yieldably holds the piston sealed deeply in a dosing chamber from which it can be shifted to project essentially by the height of the truncated piston face to completely scavenge the chamber. The device is formed of only three injection molded plastic parts and a return spring, to effect inexpensive production.

23 Claims, 4 Drawing Sheets

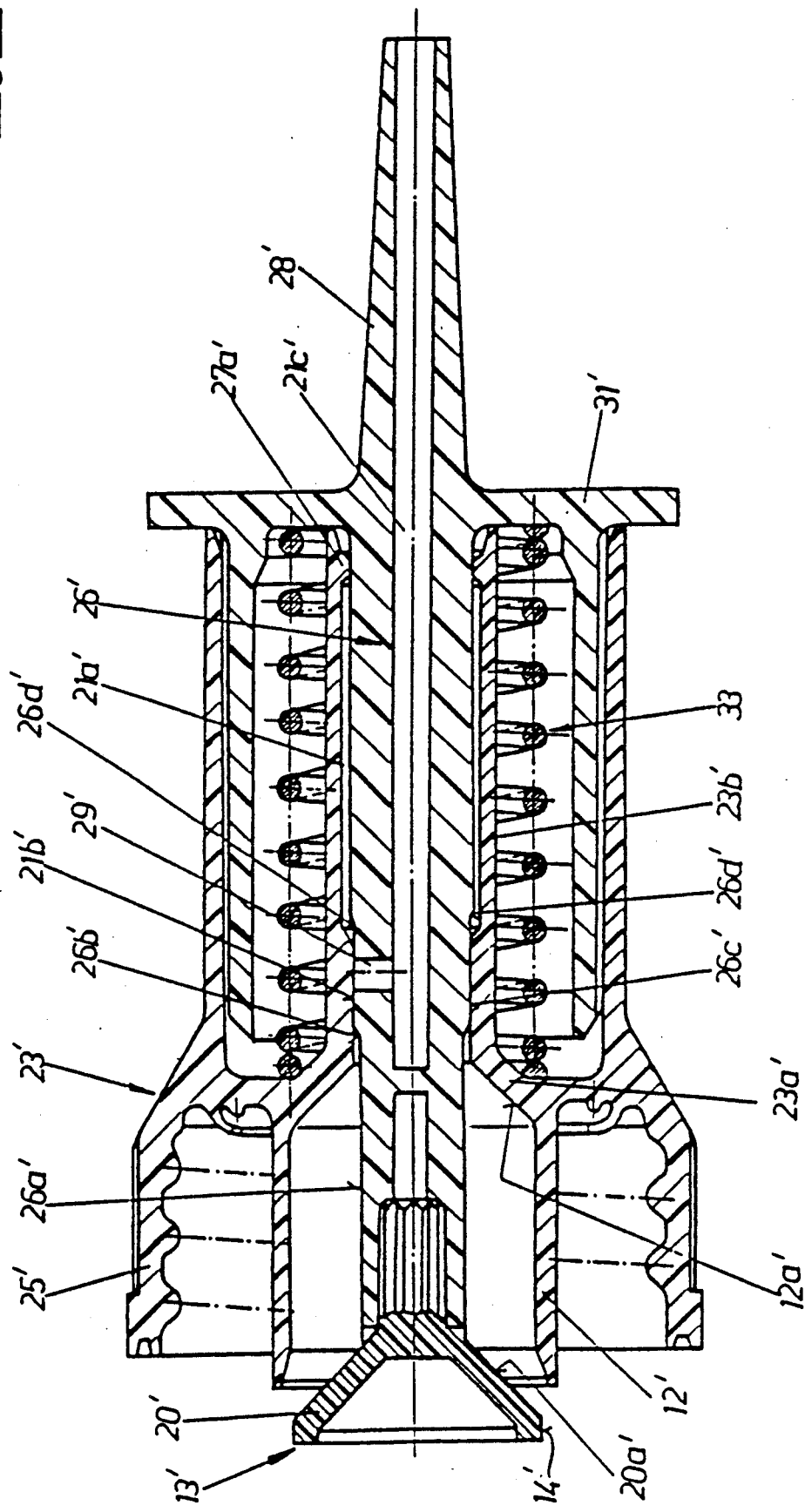

DEVICE FOR DISPENSING A DOSED AMOUNT OF FREE-FLOWING MATERIAL, IN PARTICULAR LIQUID MEDICATION FROM A CONTAINER

Cross References to Related Applications

The present application constitutes a continuation-in-part of and claims priority of copending PCT application Ser. No. PCT/EP 89/00039 filed Jan. 27, 1989, which PCT Application in turn claims priority of German Application No. P 38 03 366.6 filed Feb. 5, 1988.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

The invention relates to a device for dispensing a dosed amount of free-flowing material, in particular liquid medication from a container, said device forming at one and the same time a container closure attached or attachable to the container outlet and constituted in the manner of a dosing pump with a pumping and dosing chamber openable towards the container interior, a piston movable within the pumping and dosing chamber, and a sealed operating facility extending from the outside to the piston, the outlet channel for the material to be dispensed in doses extending along the operating facility and/or through the operating facility.

DESCRIPTION OF THE RELATED ART INCLUDING INFORMATION DISCLOSED UNDER 37 CFR §§1.97-1.99

In prior devices of this kind, particularly in a known dosing pump, the arrangement of piston and operating facility is such that the piston, in its position at rest, extends from the open end of the pumping and dosing chamber into the interior of the container having the medication. This is so that the pumping and dosing chamber is quickly and completely filled with material to be dispensed, and dispensing of the material begins immediately upon the actuation of the device. But this advantage is attainable only in permanently attached devices if they are held with the outlet channel of the pumping and dosing chamber extending downward. If the containers are carried freely in a pocket, as is common for medication containers, it cannot be assumed that, in the neutral position, i.e. with the piston protruding out of the pumping and dosing chamber, the pumping and dosing chamber will always be fully filled with the material to be dispensed, since air could be present. Even if the container's outlet is directed downwardly before actuating the dispenser, a greater or lesser amount of air can still remain in the pumping and dosing chamber and at the piston in these known closing and dispensing devices, so that the dosing accuracy of these known devices is greatly impaired. Moreover, the known devices of this kind are more or less expensive in their design so that they are out of the question as mass-produced articles.

SUMMARY OF THE INVENTION

The above disadvantages and drawbacks of prior devices are obviated by the present invention, which has for an object the provision of a closing and dispensing device in the manner of a dosing pump with an improved technical function, and also designed at the same time for mass production at low manufacturing cost.

According to the invention, this problem is solved in that the piston of the device is provided at its end facing the pumping and dosing chamber, with a truncated cone face and in that the operating facility is constructed to keep the piston in a sealing, neutral position within the pumping and dosing chamber and, for opening the pumping and dosing chamber, to move the piston out of the open end of the pumping and dosing chamber essentially by the height of the truncated cone at the piston face.

What the invention achieves is that the piston, in the neutral position of the device, forms a sealing element within the pumping and dosing chamber so that the dosing chamber, in any position of the container equipped with a closing and dispensing device according to the invention, is always closed at its outlet end and no air can get from the interior of an only partly filled container to the active face of the piston within the pumping and dosing chamber. When the piston is moved from its neutral position to its retracted initial dosing position, material remnants contained in the outlet channel are sucked back into the dosing chamber, in which process air from the outlet channel may also be sucked into the pumping and dosing chamber. As soon as the piston has been moved out of the open end of the pumping and dosing chamber, this aspirated air is immediately and effectively led out of the interior of the pumping and dosing chamber through the truncated cone-shaped face of the piston which presents no opportunity whatever for the air to cling to it. As soon as the piston has been brought into the position in which it protrudes out of the pumping and dosing chamber, no air remains in the piston and dosing chamber any more. Dosing and dispensing the free-flowing material, which starts upon moving the piston back, is thus performed with great precision. Due to the invention, this improved function is attainable at very low production costs for the device according to the invention. In particular, the invention offers the possibility of assembling the dispensing and dosing device from a very small number of plastic parts so that the device according to the invention is also mass producible at low manufacturing costs.

In a preferred embodiment of the invention, the operating facility has a return spring which forces the piston into its position at rest, retracted inside the pumping and dosing chamber. In this preferred embodiment of the invention, the operating facility is characterized by a particularly simple design, at the same time offering the functional advantage that the piston is held, by spring action, in its position retracted in the pumping and dosing chamber. In this embodiment, the device according to the invention is particularly well suited as a closure for containers of any kind, especially medication containers which must be tightly closed in any position, such as when carried or stored in pockets, or also in an upright position.

In an especially advantageous further development of the invention, particularly also in further development of the preferred embodiment, the pumping and dosing chamber has at its bottom, located away from the container interior, a conically depressed, funnel-shaped, inner face area which leads to the outlet channel and in which the truncated cone-shaped face of the piston fits in sealing fashion. In its neutral position, the piston is thus held in the pumping and dosing chamber to make sealing contact with the latter's bottom surface, thereby providing a particularly tight, safe closure. When the piston is shifted down to the bottom of the pumping and dosing chamber, there is no more residual volume in front of the piston face in the pumping and dosing chamber. Therefore, material to be dispensed is pushed out of the pumping and dosing chamber completely by means of the piston. Nor can air bubbles form between the piston face and the pumping and dosing chamber bottom when the piston is completely retracted.

It has turned out to be of particular advantage when the truncated cone-shaped piston face is constructed so as to have a cone angle on the order of 90°. One particularly advantageous piston design provides for a hollow piston with a truncated cone-shaped face wall and a cylindrical piston ring adjacent to the piston's outside diameter. This hollow piston offers great elastic flexibility in conjunction with great stability and safe sealing and guidance along the inside diameter of the piston and dosing chamber by means of the piston ring.

Safe sealing of the outlet channel towards the operating facility is attainable in a simple structure suited for mass production within the scope of the invention, by providing a pump housing which contains, within a tubular section, an outlet channel sector for the material to be dispensed, which sector guides the piston rod in sealing fashion and surrounds it annularly, the piston rod consisting of a flexible thermoplastic material and the piston rod being sealed in this outlet channel sector by thickenings molded to the piston rod. These thickenings, at least part of them, may be formed as integral outer collars molded with the piston rod. The thickenings forming the piston rod seal in the outlet channel may also be formed, for instance, by annular sections of larger outside diameter on the piston rod.

Another seal, useable within the scope of the invention and simply producible, can also be created by providing a pump housing which contains, within a tubular portion, an outlet channel sector for the material to be dispensed which guides the piston rod in sealing fashion and surrounds it annularly, said tubular part of the pump housing consisting of flexible plastic and having, as a seal at its free end, an inner, sealing collar engaging the outside diameter of the piston rod.

A particularly rugged and operationally safe design for the guidance of the piston rod and its connection to the operating facility is achieved within the scope of the invention in that a one-piece pump housing accommodating the pumping and dosing chamber and a section of the outlet channel guiding the piston rod in sealing fashion is provided, and in that the operating facility contains an operating element attached to the piston rod and a return spring inserted between said operating element and the pump housing. The return spring can be a helical compression spring for moving the piston rod axially into the pump housing. In order to cover and close off the return spring effectively from the outside, it is suggested within the scope of the invention to provide on the pump housing and on the piston rod telescoping covering walls, inside of which the return spring is disposed in an annular space. In addition to the covering function, this also makes for better guidance of the return spring.

The construction of the operating element forming part of the operating facility can vary, taking into consideration the application of the device, for instance for medication containers or other containers. For example, the operating facility can have a plate-shaped operating element attached to the free end of the piston rod, beyond which there protrudes axially a dispensing tube carried in an extension of the piston rod. In another advantageous embodiment, the operating facility can have a finger rest attached to the free end of the piston rod to act as an operating element, in which an obliqued end section of the outlet channel is formed. In a particularly advantageous embodiment of the invention, the entire device can be constituted of three plastic parts produced by injection molding and one return spring, such as of steel, the three plastic parts being the pump housing with pumping and dosing chamber and a guide tube forming a section of the outlet channel, the piston rod with its operating element, and the piston to be attached to the piston rod.

Other features and advantages will hereinafter appear.

BRIEF DESCRIPTION OF THE DRAWINGS

Embodiment examples of the invention are explained below in greater detail with reference to the drawings, in which:

FIG. 3 is an axial section of a second embodiment of the device according to the invention, in the ready position for dispensing and dosing;

DESCRIPTION OF THE PREFERRED EMBODIMENTS

Figure 5:
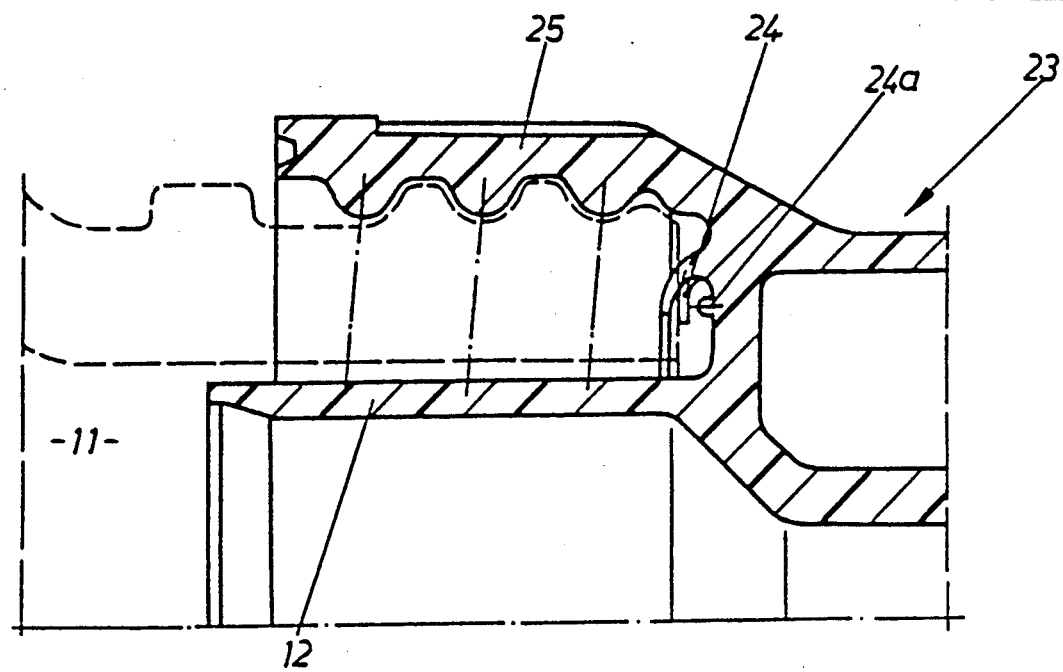
FIG. 5 is a fragmentary view of the sealing arrangement in the thread portion, provided in all the embodiments shown, in enlarged axial section.

The embodiments of the device for dispensing a dosed amount of free-flowing material, in particular liquid medication, from a container (shown dotted in FIGS. 1, 2 and 5) involve a closure structure in the manner of a dosing pump 10 comprising a pumping and dosing chamber 12 with a piston 13 axially movable therein. The piston 13 is constituted as a hollow piston having a truncated cone-shaped face wall 20 with a truncated cone-shaped front face 20a, FIG. 2, which can have a cone angle alpha of, say, 90°. Adjoining the rear peripheral rim of the face wall 20 is a wall portion in the form of a cylindrical piston ring 14 which is in sealing engagement with the inside surface 15 of the pumping and dosing chamber 12 as long as the piston 13 is inside the chamber. In the neutral and sealing position shown in FIG. 1, the front face 20a of piston 13 is in sealing engagement with the conical bottom surface 22a on the inner face wall 22 of the pumping and dosing chamber 12, said bottom surface 22a closely fitting the said front face 20a and leading to the centrally disposed outlet channel 21x, 21.

Figure 2:
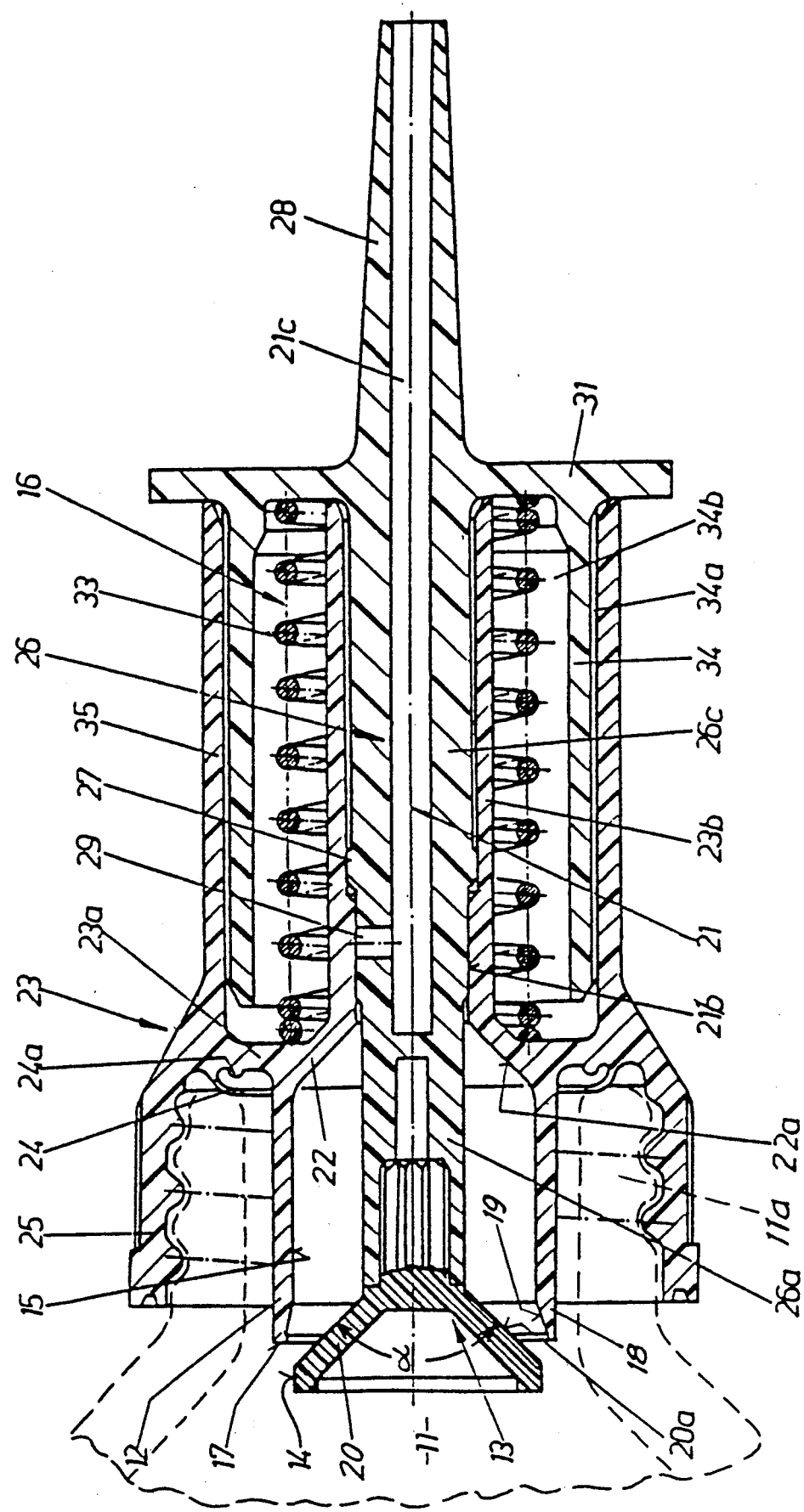
FIG. 2 is an axial section of the device according to FIG. 1, in the ready position for dispensing and dosing.

As is evident from FIG. 2, the piston 13 can be moved axially out of the open face 17 of the pumping and dosing chamber 12 into the container interior marked 11 by pushing the piston rod 26 inwardly by means of the actuating element 31 provided on it. Correspondingly, the peripheral wall of the pumping and dosing chamber 12 merely has towards the container interior 11 a face rim 18, on which is formed an annular, flared-out inside surface area 19.

Figure 1:
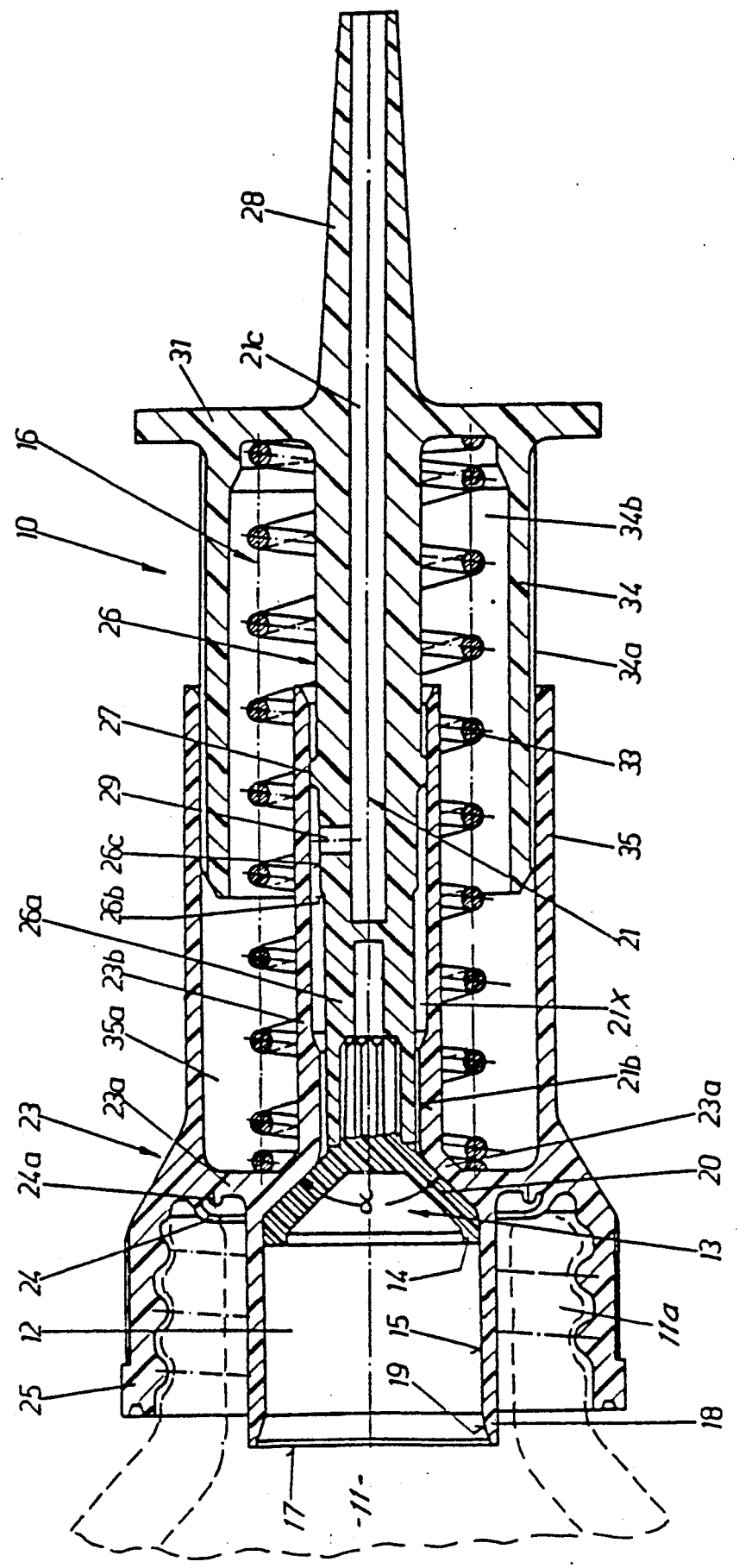
FIG. 1 is an axial section of a preferred embodiment of the device according to the invention, in its neutral position.

As a comparison of FIGS. 1 and 2 demonstrates, the piston 13 in its neutral position shown in FIG. 1 constitutes a reliable sealing element for the dosing pump 10 and, hence, for the container to which the dosing pump 10 is attached. This is accomplished in particular by the interaction of the piston ring 14 engaging the inside surface 15 of the pumping and dosing chamber 12 and the mutually sealing contact of the tapered surfaces on face 20a of the piston 13 and the tapered bottom surface 22a of the face wall 22 of the pumping and dosing chamber 12.

Adjoining the pumping and dosing chamber 12 on the side away from the container interior marked 11 is the pump housing 23 which accommodates the operating facility 16 for the piston and the outlet channel 21x, 21. The pump housing 23 must be screwed, by means of a threaded ring 25 molded to it coaxial with the pumping and dosing chamber 12, onto a thread 11a at the outlet opening of the respective container, such as a medicine bottle, until the sealing lip 24 molded within the screw ring 25 and encircling the outside of the pumping and dosing chamber makes contact with the face of said outlet opening and is pressed firmly and sealingly against the face of the outlet opening on the container by means of a pressure ring 24a formed behind the sealing lip 24, as indicated by broken lines in FIG. 5.

Formed in the pump housing 23 is an annular, intermediate bottom 23a which connects the screw ring 25 and the pumping and dosing chamber 12 to make them a single part and which supports, on its side away from the pumping and dosing chamber 12, a guide tube 23b. The interior of the guide tube 23b forms part of the outlet channel 21, 21x, disposed axial and central to the pumping and dosing chamber 12 and accommodating the piston rod 26 which is part of the operating facility 16 for the piston 13. For example, there is formed between the outside diameter of the piston rod 26 and the bore of the guide tube 23b accommodating it the outlet channel section 21x which is expanded in the manner of a chamber and which goes over into the pumping and dosing chamber 12 via a narrowing 21b so that the pumping and dosing chamber 12, with its conical bottom surface 22a, forms a funnel-shaped transition to the expanded part 21x of the outlet channel section.

Figure 4:
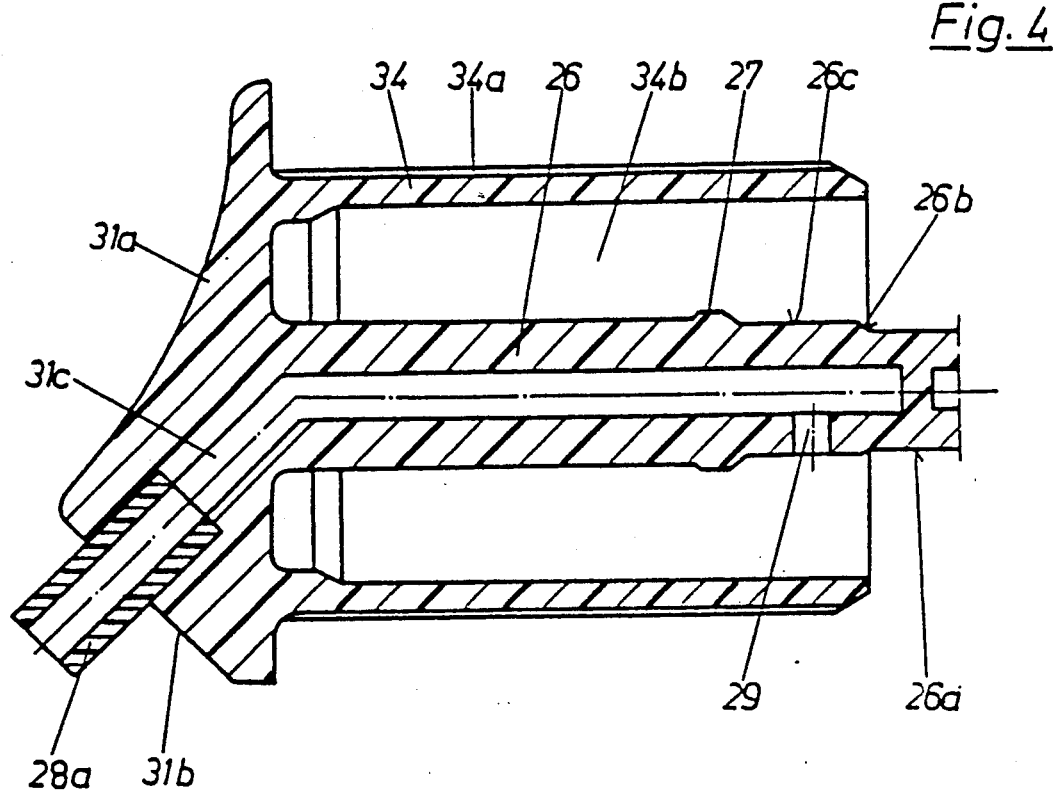
FIG. 4 is an axial section of the operating element provided on the piston rod, in a third embodiment of the device according to the invention.

At its end away from the pumping and dosing chamber 12 the chamber-like, expanded part 21x is closed by a sealing collar 27 which is molded and integral with the piston rod 26 and protrudes from the exterior surface thereof. Since the piston rod 26 is made of flexible, soft plastic, the sealing collar 27 engages the inside diameter of the guide tube 23b in sealing fashion. The foremost portion of the outlet channel 21, open towards the outside, is formed in the examples shown by a central bore 21c of the piston rod 26 and by an outlet tube 28 or 28a (FIG. 4 modification). The exterior, open portion 21c of the outlet channel 21, formed by the central bore in the piston rod 26, communicates with the expanded, channel-like portion 21x formed in the interior of the guide tube 23b through a cross hole 29 in the piston rod 26.

The cross hole 29 is located in a larger diameter section 26c of the piston rod 26. This section 26c extends from the sealing collar 27 towards the piston 13, up to a tapered shoulder 26b, whence a smaller diameter section 26a of the piston rod 26 extends to the piston 13. The outside diameter of the piston rod 26 in the section 26c is such that the section (26c) fits sealingly into the narrowing 21b of the outlet channel 21x while the smaller diameter section 26a of the piston rod 26 still leaves open, in the narrowing 21b, an annular passage therein, leading from the pumping and dosing chamber 12 into the chamber-like, expanded portion 21x of the outlet channel 21, 21x.

The example of FIG. 3 shows a modification of the example according to FIGS. 1 and 2, in that the piston rod 26' has a tapered shoulder 26d' as the termination of its larger diameter section 26c' towards the free piston rod end, while the smaller diameter section 26a' and the tapered shoulder 26b' located between the larger diameter area 26c' and the smaller diameter area 26a' are provided in the same manner as in the examples of FIGS. 1 and 2. The seal of the expanded portion 21a' of the outlet channel formed inside the guide tube 23b' is accomplished in this example by a sealing collar or bead 27a' which encircles the piston rod and is molded on the inside of the free end zone of the guide tube 23b', to make a sliding fit with the rod 26'.

In the example of FIG. 4 another modification is provided, shown reversed left to right, in that an operating element 31a molded to the free end of the piston rod 26 is constructed in the form of a finger rest and has a bevel 31b in which an outlet hole 31c is provided at about a 45° inclination to the axis of piston rod 26, and in which an outlet tube 28a is obliquely inserted. For the rest, the piston rod 26 may be constructed in the same way as in the example of FIGS. 1 and 2, or in the example of FIG. 3.

In all three embodiment examples depicted, the operating element 31 or 31a is provided with a covering wall 34 which extends coaxial to the piston rod 26, that is, towards the piston bearing end and which is molded integrally to the unit formed by the operating element 31 or 31a and the piston rod 26. The outside of this covering wall 34 has guiding ribs 34a and, together with the piston rod 26, form a cylindrical hollow space 34b for the accommodation of a return spring 33 which is part of the operating facility 16. In the examples shown, there is formed on the pump housing 23, coaxial with the guide tube 23b, a cylindrical covering wall 35 which, together with the guide tube 23b, forms an annular space 35a to seat the return spring 33 and to accommodate the covering wall 34. The two covering walls 34 and 35 are constituted so that they fit into each other in telescoping fashion and that the covering wall 34, with its guiding ribs 34a, slides along the inside surface of the covering wall 35. In this way, the guidance of the piston rod 26 in the guide tube 23b is further improved and complemented by the telescoping guidance along the covering walls 34 and 35, thereby primarily assuring a reliable cover for the return spring 33 in any position of the piston rod 26 in relation to the pump housing 23.

In order to remove a measured quantity of free-flowing material from a container having the dosing pump 10, the container with the dosing pump 10 must be arranged so that the axis of the dosing pump 10 is placed roughly vertically down, but at least so that the outlet tube 28 or 28a is directed downwardly. Then the piston 13 is pushed in via the piston rod 26 by means of the operating element 31 or 31a, countering the force of the return spring 33, until the piston is moved completely out of the pumping and dosing chamber 12. During this axial movement the piston 13 aspirates air through the outlet channel 21. In so doing, residual liquid present in the outlet channel 21 is pulled back into the pumping and dosing chamber and the air required for pressure equalization is sucked into the container interior. This process is concluded as soon as the larger diameter area 26c on the piston rod 26 arrives at the beginning of the narrowing 21b. The elements are so harmonized with each other that, at this moment, the piston ring 14 gets into the conically expanded inside surface area 19 of the pumping and dosing chamber. As the piston rod 26 is pushed in further, the piston 13 is then moved out of the pumping and dosing chamber 12 and the larger diameter area 26c of piston rod 26 is pushed further into the narrowing 21b. In the furthermost depressed position of the element 31 (or in the "ready" position for dispensing and dosing), the larger diameter area 26c of piston rod 26 is virtually entirely within the narrowing 21b and extends close to the transition of the narrowing 21b at the pumping and dosing chamber 12 while the truncated cone-shaped face 20a of the piston 13 has gotten close to the opening of the pumping and dosing chamber 12. The pumping and dosing chamber 12 is thus in communication with the interior 11 of the container. The air which got into the interior of the pumping and dosing chamber 12 while the piston rod 26 was moved from its position at rest (FIG. 1) into the ready position for dispensing and dosing (FIG. 2) is steered completely and smoothly along the tapered face 20a of piston 13 into the container interior 11 so that the material to be measured out can enter the pumping and dosing chamber unhindered and fill it completely. This action is further supported by the conically expanded inside surface area 19 at the face rim 18 of the pumping and dosing chamber 12.

In the example of FIG. 4, the user will move, possibly at once or at the latest when initiating the dispensing process, the container with the dosing pump into a position in which the dispensing tube 28a is pointing down and the piston rod 26 as well as the pumping and dosing chamber obliquely up. In conjunction with the truncated cone-shaped face 20a of piston 13, this oblique position of the piston rod 26 and of the pumping and dosing chamber 12 achieves once more an improved and complete elimination of the air from the pumping and dosing chamber 12.

To initiate the dispensation of a dosed material quantity, the user releases the operating element 31 or 31a for its return motion, either entirely or slowed down with one or more fingers. The thus enabled return motion of the piston rod 26 and of the piston 13 from the ready position for dispensing and dosing into the position at rest is brought about by the force of the return spring 33. The piston ring 14 of the piston 13 first rides over the annular, expanded inside surface 19 so that excess material in the area of the opening on the face side of the pumping and dosing chamber 12 can still flow back past the piston ring 14 into the interior 11 of the container. As soon as the piston ring 14 reaches the transition area from the tapered surface 19 to the cylindrical inside diameter 15 of the pumping and dosing chamber 12, this post-dosing process is concluded and the acquired amount of free-flowing material is matched exactly to the volume of the pumping and dosing chamber. During the continuing return motion the larger diameter area 26c of the piston rod 26 moves out of the narrowing 21b. The piston 13 now presses the material caught in the pumping and dosing chamber 12 through the narrowing 21b, through the chamber-like, expanded portion 21x, through the cross hole 29, the rod bore 21 and out through the outlet tube 28 or 28a to the outside.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LIST OF REFERENCE SYMBOLS

10 Dosing pump
11 Container Interior
11a Container Thread
12 Pumping and dosing chamber
13 Piston
14 Piston ring
15 Inside diameter
16 Operating facility
17 Face
18 Face rim
19 Inside surface area
20 Face wall of piston 13
20a Face of piston 13
21 Outlet channel
21a Expanded portion - passage providing means
21b Narrowing
21c Open part
21x Outlet channel
22 Face wall
22a Bottom surface
23 Pump housing
23a Intermediate bottom wall
23b Guide tube
24 Sealing lip
24a Pressure ring
25 Screw ring
26 Piston rod
26a Smaller diameter section
26b Tapered shoulder
26c Larger diameter area
27 Sealing collar
28 Outlet tube
28a Outlet tube
29 Cross hole
31 Operating element
31a Finger rest
31b Oblique end section of 31a
33 Return spring
34 Covering wall
34a Guide ribs
34b Cylindrical annular chamber
35 Covering wall
35a Annular space

What is claimed is:

1. A device for dispensing a dosed amount of free-flowing material, in particular a liquid medication from a container, said device forming at one and the same time a container closure attachable to a container outlet and a dosing pump (10), said pump comprising a pumping and dosing chamber (12) having a face wall (22), a circumferential wall and an open end (17) which latter faces towards the container interior (11) and connects with an outlet channel (21), said pump further comprising a piston (13) movable within the pumping and dosing chamber (12) between an open position, and a sealing position at rest fully within the pumping and dosing chamber, and further comprising a sealed operating facility (16) extending from the outside and connected to the piston (13), the outlet channel (21) of said device extending from the face wall (22) of the pumping and dosing chamber (12) outwardly through the operating facility (16), characterized in that the piston (13) is provided, at its end which faces said face wall (22) of the pumping and dosing chamber (12), with a truncated cone-shaped face (20a), said face wall (22) comprising a truncated cone-shaped bottom face (22a) having substantially the same cone angle as the said truncated cone-shaped face (20a) of the piston (13) and being adapted to contact the truncated cone-shaped face (20a) when the operating facility (16) holds the piston (13) in its sealing position at rest fully within the pumping and dosing chamber (12), said device having a guide tube (23b) connected to said pumping and dosing chamber (12), said piston (13) having a piston rod (26) coaxially guided within the guide tube (23b), said piston rod (26) being adapted to move the piston (13) to its open position out of and projecting from the open end (17) of the pumping and dosing chamber (12) in response to force applied thereto, said guide tube (23b) and piston rod (26) forming a space between them which constitutes part of said outlet channel (21), said piston rod (26) having a sealing collar (27) engageable with said guide tube (23b) to provide a sliding seal therewith during movement of said piston rod (26), and said outlet channel (21) having valving means adapted to be closed by a wall of the guide tube (23b) when the piston (13) is moved towards its open position, and which opens as the piston (13) is moved towards its sealing position.

2. A device according to claim 1, characterized in that the operating facility (16) contains a return spring (33) which retains the piston (13) in its sealing position at rest fully within the pumping and dosing chamber (12).

3. A device according to claim 1, characterized in that said truncated cone-shaped bottom face (22a) has an opening which leads to the outlet channel (21).

4. A device according to claim 1, characterized in that the truncated cone-shaped bottom face (20a) of the piston (13) has a cone angle on the order of 90°.

5. A device according to claim 1, characterized in that the piston (13) is hollow and has an annular piston ring (14) along a peripheral edge thereof.

6. A device according to claim 1, characterized in that the operating facility (16) comprises a plate-shaped operating element (31) connected to the piston rod (26), said element (31) being mounted adjacent the free end of the piston rod (26), said piston rod (26) having a dispensing tube (28) which protrudes axially therefrom.

7. A device according to claim 1, characterized in that the operating facility (16) has, as an operating element, a finger rest (31a) mounted adjacent the free end of the piston rod (26), said finger rest having an oblique portion (31b) and a nozzle (28a).

8. A device according to claim 1, characterized in that the device comprises three injection molded plastic parts and a return spring (33), said parts being constituted of a pump housing (23) integral with the pumping and dosing chamber (12) and with the guide tube (23b), the piston rod (26) and an integral operating element (31, 31a), and the piston (13) attached to the piston rod.

9. A device according to claim 8, characterized in that there are provided, in order to cover the return spring (33), covering walls (34, 35) guided so as to telescope in one another, one of said covering walls (34) being molded integrally with the piston rod (26) and operating element (31, 31a), and the other covering wall (35) being molded integrally with the pump housing (23).

10. A device for dispensing a dosed amount of free-flowing material, in particular a liquid medication from a container, said device forming at one and the same time a container closure attachable to a container outlet and a dosing pump (10) having a pumping and dosing chamber (12) openable towards the container interior and connecting with an outlet channel, a piston (13) movable within the pumping and dosing chamber (12), and a sealed operating facility (16) extending from the outside and connected to the piston (13), said device having an outlet channel (21) extending along the operating facility (16) for the material to be dispensed in doses, characterized in that the piston (13) is provided, at its end facing the pumping and dosing chamber (12) with a truncated cone-shaped face (20a) and that the operating facility (16) yieldably holds the piston (13) in a sealing position at rest fully within the pumping and dosing chamber (12) and is adapted to move the piston out of and projecting from the open end (17) of the pumping and dosing chamber (12) in response to an overpowering force, and characterized in that a pump housing (23) is provided, having a tubular guide portion (23b), and a piston rod (26) having a stem portion (26c) provided with an outlet channel for the material to be dispensed, said guide portion (23b) guiding the piston rod (26) in sealing fashion and surrounding it annularly; said piston rod (26) comprising flexible thermoplastic material and the piston rod (26) having seal means (27) formed on said guide portion by a collar extending around the piston rod (26).

11. A device according to claim 10, characterized in that the collar forming the seal for the piston rod (26) is integrally molded on the rod.

12. A device according to claim 10, characterized in that the seal means on the piston rod (26) comprises, in addition to said collar (27), an annular rod surface (21b) adjoining the collar.

13. A device for dispensing a dosed amount of free-flowing material, in particular a liquid medication from a container, said device forming at one and the same time a container closure attachable to a container outlet and a dosing pump (10) having a pumping and dosing chamber (12) openable towards the container interior and connecting with an outlet channel, a piston (13) movable within the pumping and dosing chamber (12), and a sealed operating facility (16) extending from the outside and connected to the piston (13), said device having an outlet channel (21) extending along the operating facility (16) for the material to be dispensed in doses, characterized in that the piston (13) is provided, at its end facing the pumping and dosing chamber (12) with a truncated cone-shaped face (20a) and that the operating facility (16) yieldably holds the piston (13) in a sealing position at rest fully within the pumping and dosing chamber (12) and is adapted to move the piston out of and projecting from the open end (17) of the pumping and dosing chamber (12) in response to an overpowering force, and characterized in that a pump housing (23') is provided, having a tubular guide portion (23b'), and a piston rod (26') having a stem portion (26c') provided with an outlet channel for the material to be dispensed, said guide portion (23b') guiding the piston rod (26') in sealing fashion and surrounding it annularly; said guide portion (23b') comprising flexible plastic and having a sealing collar (27a') engaging the outside surface of the piston rod (26').

14. A device for dispensing a dosed amount of free-flowing material, in particular a liquid medication from a container, said device forming at one and the same time a container closure attachable to a container outlet and a dosing pump (10) having a pumping and dosing chamber (12) openable towards the container interior and connecting with an outlet channel, a piston (13) movable within the pumping and dosing chamber (12), and a sealed operating facility (16) extending from the outside and connected to the piston (13), said device having an outlet channel (21) extending along the operating facility (16) for the material to be dispensed in doses, characterized in that the piston (13) is provided, at its end facing the pumping and dosing chamber (12) with a truncated cone-shaped face (20a) and that the operating facility (16) yieldably holds the piston (13) in a sealing position at rest fully within the pumping and dosing chamber (12) and is adapted to move the piston out of and projecting from the open end (17) of the pumping and dosing chamber (12) in response to an overpowering force, and characterized in that a pump housing (23) is provided, which contains the pumping and dosing chamber (12) and has passage providing means which engages and guides the piston rod (26) in sealing fashion, and that the operating facility (16) has an operating element (31, 31a) mounted on the piston rod and a return spring (33) acting on said operating element (31, 31a) and contained in the pump housing (23).

15. A device according to claim 14, characterized in that the return spring (33) is a helical compression spring which moves the piston rod (26) axially out of the pump housing (23).

16. A device according to claim 14, characterized in that there are provided on the pump housing (23) and on the piston rod (26) covering walls (34, 35) which are guided relative to each other in telescoping fashion and within which the return spring (33) is disposed in annular chambers (34a, 35a).

17. A device according to claim 10, characterized in that there are provided on the pump housing (23) and on the piston rod (26) covering walls (34, 35) which telescope with each other, said tubular guide portion (23b) which guides the piston rod (26) being disposed coaxially within said covering walls (34, 35).

18. A device for dispensing a dosed quantity of free-flowing material, in particular a liquid medication from a container, said device forming at one and the same time a container closure attachable to a container outlet and a dosing pump (10), said pump comprising a pumping and dosing chamber (12) having at its one end a face wall (22) which contains a central opening constituting a connection to an outlet channel (21), said chamber having at its other end an edge face (17) open towards the container interior, said device comprising a piston (13) movable in the pumping and dosing chamber (12) between open and sealing positions, said piston (13) having a piston rod (26) which is guided through said central opening in said face wall (22), and an operating facility (16) extending in sealed fashion from the outside to the piston (13), said device having said outlet channel (21) extending from said central opening in said face wall (22) outwardly through the operating facility (16), characterized in that the piston (13) has, at its end facing the bottom (23a) of the pumping and dosing chamber (12), a truncated cone-shaped face (20a), in that the operating facility (16) yieldably holds the piston (13) in the sealing position at rest inside the pumping and dosing chamber (12) and is adapted to move the piston to an open position, out of the open end (17) of the pumping and dosing chamber (12), essentially by a distance on the order of the height of the truncated cone on the piston face (20a), and said pump further comprising a guide tube (23b) surrounding said piston rod (26) in spaced relation thereto, the spacing thereof forming a section of said outlet channel (21), said guide tube (23b) and piston rod (26) having cooperable portions constituting a valving means which is closed when the piston (13) is in its open position and which opens as the piston (13) is moved toward its sealing position, and said guide tube (23b) and piston rod (26) having other cooperable portions (27, 23b) constituting a continuously operable sealing means.

19. A device according to claim 18, characterized in that the operating facility (16) contains a return spring (33) which normally retains the piston (13) in its sealing position, retracted into the pumping and dosing chamber (12).

20. A device according to claim 18, characterized in that the operating facility (16) has, as an operating element, a finger rest (31a) which is attached to the free end of the piston rod (26) and in which an obliqued end section (31b) of the outlet channel is formed.

21. A device according to claim 18, characterized in that the device comprises three injection molded plastic parts and a return spring (33), said parts being constituted of a pump housing (23) integral with the pumping and dosing chamber (12) and with the guide tube (23b), the piston rod (26) and an integral operating element (31, 31a), and the piston (13) attached to the piston rod.

22. A device according to claim 21, characterized in that there are provided, in order to cover the return spring (33), covering walls (34, 35) which are guided in one another in telescoping fashion, one of the covering walls (34) being molded integrally with the piston rod (26) and operating element (31, 31a) and the other covering wall (35) being molded integrally with the pump housing (23).

23. A device for dispensing a dosed quantity of free-flowing material, in particular a liquid medication from a container, said device forming at one and the same time a container closure attachable to a container outlet and a dosing pump (10) having a pumping and dosing chamber (12) having a face (17) open towards the container interior, a piston (13) movable in the pumping and dosing chamber (12) between open and sealing positions, and an operating facility (16) extending in sealed fashion from the outside to the piston (13), said device having an outlet channel (21) extending along the operating facility (16) for the material to be dispensed in doses characterized in that the piston (13) has, at its end facing the bottom (23a) of the pumping and dosing chamber (12), a truncated cone-shaped face (20a), in that the operating facility (16) yieldably holds the piston (13) in the sealing position at rest inside the pumping and dosing chamber (12) and is adapted to move the piston to an open position, out of the open end (17) of the pumping and dosing chamber (12), essentially by a distance on the order of the height of the truncated cone on the piston face (20a), and in that the outlet channel contains, over a part of its length, a sealing means which is rendered closed and sealed when the piston is in an open position, and characterized in that the outlet channel (21) has a portion (21b) which adjoins the pumping and dosing chamber (12) and surrounds the piston rod (26) annularly, and a portion (21c) extending inside the piston rod (26), as well as a cross hole (29) which connects the two portions, the portion (21b) of the outlet channel surrounding the piston rod (26) constituting a narrowing (21b), while the cross hole (29) is provided in a thickened section (26c) of the piston rod (26) which fits into the narrowing (21b) in sealing fashion and which is so disposed in relation to the piston (13) that, during the last part of the pushing-in motion of the piston rod (26), the thickened section (26c) of the piston rod (26) is moved into the narrowing (21b) and the piston (13) is moved out of the pumping and dosing chamber (12), in unison with one another.

* * * * *